United States Patent
Yoshikawa

(10) Patent No.: US 8,234,353 B2
(45) Date of Patent: Jul. 31, 2012

(54) METHOD, SYSTEM, AND SERVICE SERVER FOR PROVIDING FIRMWARE THROUGH COMMUNICATION NETWORK

(75) Inventor: Hiroyasu Yoshikawa, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 301 days.

(21) Appl. No.: 12/418,385

(22) Filed: Apr. 3, 2009

(65) Prior Publication Data

US 2009/0287795 A1    Nov. 19, 2009

(30) Foreign Application Priority Data

May 15, 2008  (JP) ................................ 2008-128312

(51) Int. Cl.
  *G06F 15/16* (2006.01)
(52) U.S. Cl. ........................................................ 709/219
(58) Field of Classification Search .................... 709/219
  See application file for complete search history.

(56) References Cited

U.S. PATENT DOCUMENTS

2004/0236567 A1*  11/2004  Rothman et al. .................. 704/8
2006/0155527 A1*  7/2006  Choi .................................. 704/2

FOREIGN PATENT DOCUMENTS

| JP | 09-207392 | 8/1997 |
|---|---|---|
| JP | 2001-060196 | 3/2001 |
| JP | 2001142599 A | 5/2001 |
| JP | 2002-251261 | 9/2002 |
| JP | 2003-098907 | 4/2003 |
| JP | 2006351035 A | 12/2006 |
| JP | 2007310695 A | 11/2007 |

OTHER PUBLICATIONS

Japanese language office action and its English language translation for corresponding Japanese application 20080128312 1.

* cited by examiner

*Primary Examiner* — Hussein Elchanti
*Assistant Examiner* — Maceeh Anwari
(74) *Attorney, Agent, or Firm* — DLA Piper LLP (US)

(57) ABSTRACT

A firmware providing method in which firmware for an electronic device is downloaded from a service server provided on a communication network to a communication terminal. Display information to be displayed on a display of the electronic device is stored in the service server as language standard data that responds to a plurality of languages in accordance with a model of the electronic device. The communication terminal downloads, from among the language standard data, data in which a model of the electronic device and a language are specified, edits at least a portion of the language standard data, and then transmits the edited display information to the service server. In response thereto, the service server generates firmware for the electronic device of the same model based on the edited display information and returns the firmware to a return target terminal.

3 Claims, 8 Drawing Sheets

EDIT DISPLAY LITERAL DATA
STANDARD DATA "XXXX"

| NO | MESSAGE CONTENT |
|----|-----------------|
| 1  |                 |
| 2  | COPYING IS READY |
| NO |                 |
| ⋮  | ⋮               |

DISPLAY LITERAL DATA

NAME [ 122 ]   [ OUTPUT ] 123

↓

EDIT DISPLAY LITERAL DATA
STANDARD DATA "XXXX"

| NO | MESSAGE CONTENT |
|----|-----------------|
| 1  |                 |
| 2  | COPYING IST BEREIT |
| NO |                 |
| ⋮  | ⋮               |

DISPLAY LITERAL DATA

NAME [ 122 ]   [ OUTPUT ] 123   [ SIMULATOR ] 125

124 — OUTPUT IS COMPLETED.   [ FIRMWARE ] 126

FIG. 8
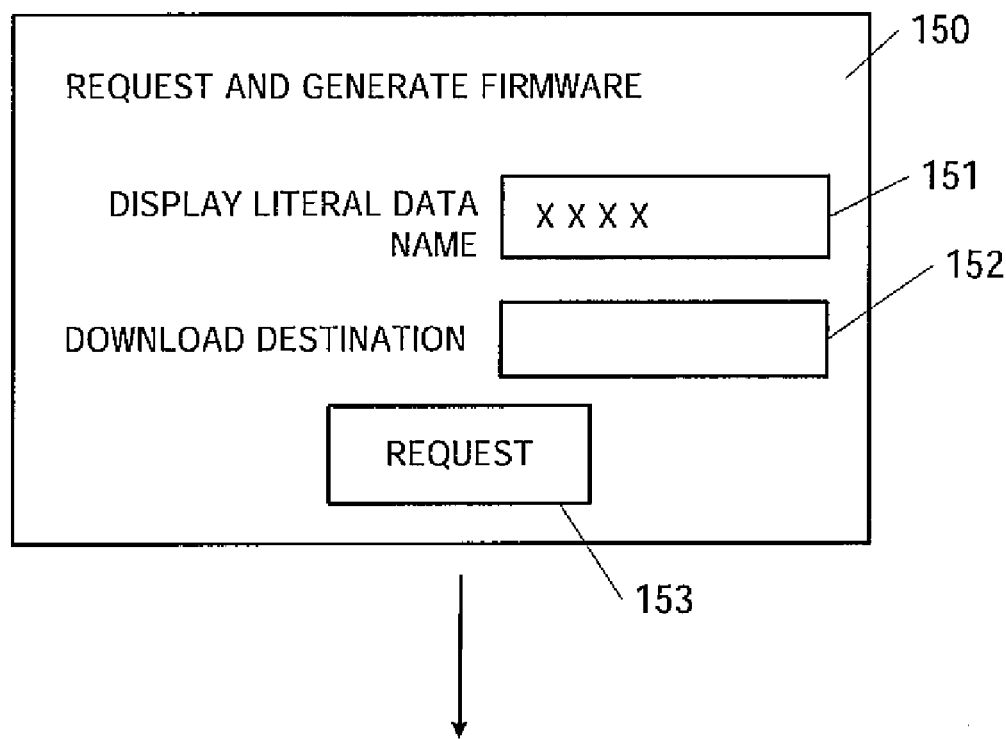
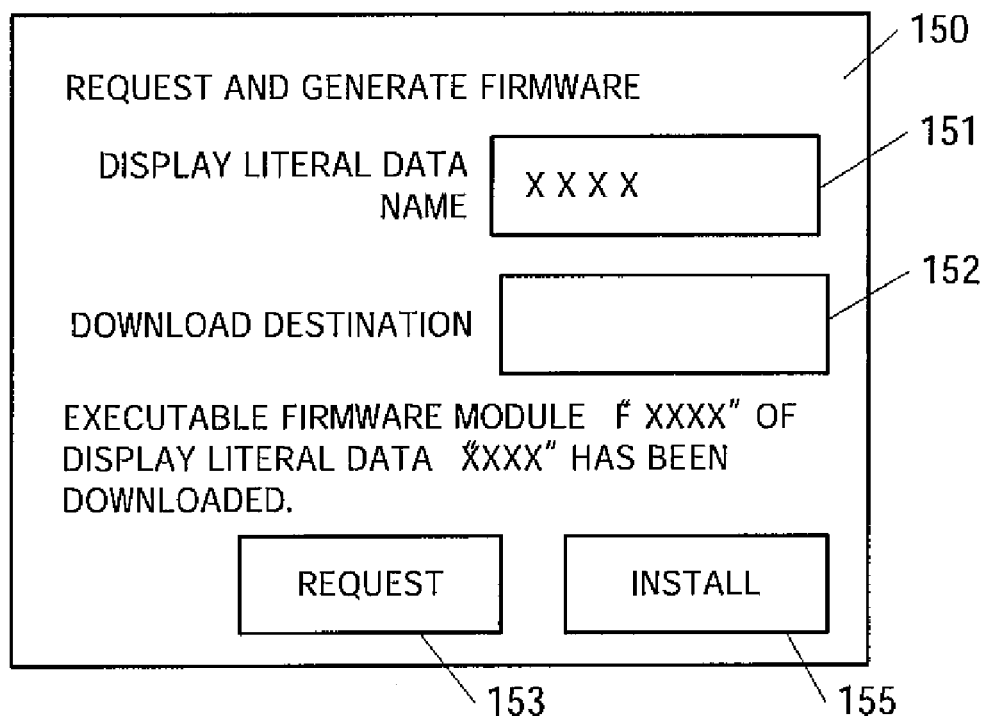

METHOD, SYSTEM, AND SERVICE SERVER FOR PROVIDING FIRMWARE THROUGH COMMUNICATION NETWORK

CROSS-REFERENCE TO RELATED APPLICATIONS

This application claims priority under 35 U.S.C. 119 to Japanese Patent Application No. 2008-128312, filed on May 15, 2008, which application is hereby incorporated by reference in its entirety.

BACKGROUND OF THE INVENTION

1. Field of the Invention

The present invention relates to a method, system and service server for providing firmware through a communication network and, in particular, to a method, system and service server arranged on the communication network and from which firmware for electronic devices is downloaded to a communication terminal.

2. Description of the Related Art

In electronic devices used in several countries, such as an image forming device, for example, literal information of guides and operating information displayed on a display of such an electronic device often differs according to the country and needs of users even when such electronic devices are the same model.

Such literal information is commonly incorporated in firmware that is installed on a flash memory of the electronic device. Therefore, when a user requests a change of the literal information after being provided with such an electronic device, maintenance personnel of the manufacturer directly rewrites the firmware of the electronic device using a dedicated device. For example, language data is installed on the flash memory through an external recording medium such as an IC card.

However, such a literal information change request made by the user varies, ranging from a request for changing a language, for example, from German to French, to a request for responding to certain expressions and dialects that are used in one language. Moreover, because the user frequently makes such requests, the requests are often not sufficiently dealt with.

SUMMARY OF THE INVENTION

In order to overcome the problems described above, the present invention provides a method, system, and service server for providing firmware of an electronic device through a communication network in which literal information incorporated in the firmware can be changed to a desired content at a desired timing by a user.

One embodiment of the present invention is a firmware providing method in which firmware for an electronic device is downloaded from a service server arranged on a communication network to a communication terminal. Display information to be displayed on a display of the electronic device is stored in the service server as language standard data that responds to a plurality of languages in accordance with a model of the electronic device. The communication terminal downloads, from among the language standard data, data in which a model of the electronic device and a language are specified, edits at least a portion of the language standard data, and transmits the edited display information to the service server. In response thereto, the service server generates firmware for the electronic device of the same model based on the edited display information and then returns the firmware to a return target terminal.

In another embodiment, based on the display information returned from the communication terminal, the service server generates a simulator by which a simulation display of the display information is executed and transmits the simulator to the return target terminal.

Another embodiment of the present invention is a firmware providing system in which firmware for the electronic device is downloaded from the service server arranged on the communication network to the communication terminal. The display information displayed on the display of the electronic device is stored in the service server as language standard data that responds to the plurality of languages in accordance with the model of the electronic device. The communication terminal downloads, from among the language standard data, data in which the model of the electronic device and the language are specified, edits at least a portion of the language standard data, and transmits the edited display information to the service server. In response thereto, based on the display information, the service server generates the firmware for the electronic device of the same model and returns the firmware to the return target terminal.

In another embodiment, based on the display information returned from the communication terminal, the service server generates the simulator by which a simulation display of the display information is executed and transmits the simulator to the return target terminal.

Another embodiment of the present invention is the service server that transmits the firmware for the electronic device to the communication terminal via the communication network. The service server includes the language standard data in which the display information displayed on the display of the electronic device is stored in such a manner that the display information responds to the plurality of languages in accordance with the model of the electronic device; a standard data providing unit that transmits specified data from among the language standard data when a return request for the language standard data in which the model of the electronic device and the language are specified is received from the communication terminal; and a firmware generating unit that generates the firmware for the electronic device of the same model based on the display information when the display information in which at least the portion of the language standard data has been edited is received from the communication terminal.

According to another embodiment, the service server further includes a simulator generating unit that generates, based on the display information returned from the communication terminal, a simulator by which a simulation display of the display information is executed and then transmits the simulator to the return target terminal.

According to an embodiment of the present invention, the display information displayed on the display of the electronic device can be edited by the communication terminal, and the firmware can be generated in the service server based on the edited display information. Therefore, the user can easily change the display information. Moreover, when a user interface program that enables the user to operate the communication terminal is provided, the user does not need to ask for maintenance personnel. Thus, the display information can be changed any time at a desired timing.

Further, the service server includes the language standard data that responds to the plurality of languages in accordance with the model of the electronic device. Therefore, certain standard data desired by the user can be downloaded in accordance with a request made by the communication terminal.

The user can download desired language standard data. Therefore, the user can change a currently used language of all messages to another language. Furthermore, by displaying the standard data through the user interface program, and by enabling the user to perform an editing operation, the user can change only a specific message.

Further, in the embodiment in which the service server generates the simulator and provides the communication terminal with the simulator, the edited display information can be easily confirmed on a side of the communication terminal.

Other features, elements, processes, steps, characteristics and advantages of the present invention will become more apparent from the following detailed description of embodiments of the present invention with reference to the attached drawings.

BRIEF DESCRIPTION OF THE DRAWINGS

FIG. 5 illustrates a display-literal-data edit screen of the UI program according to an embodiment of the present invention.

FIG. 8 illustrates a firmware request screen of the UI program according to an embodiment of the present invention.

DETAILED DESCRIPTION OF EMBODIMENTS OF THE INVENTION

With reference to the drawings, embodiments of the present invention will be described.

Figure 1:
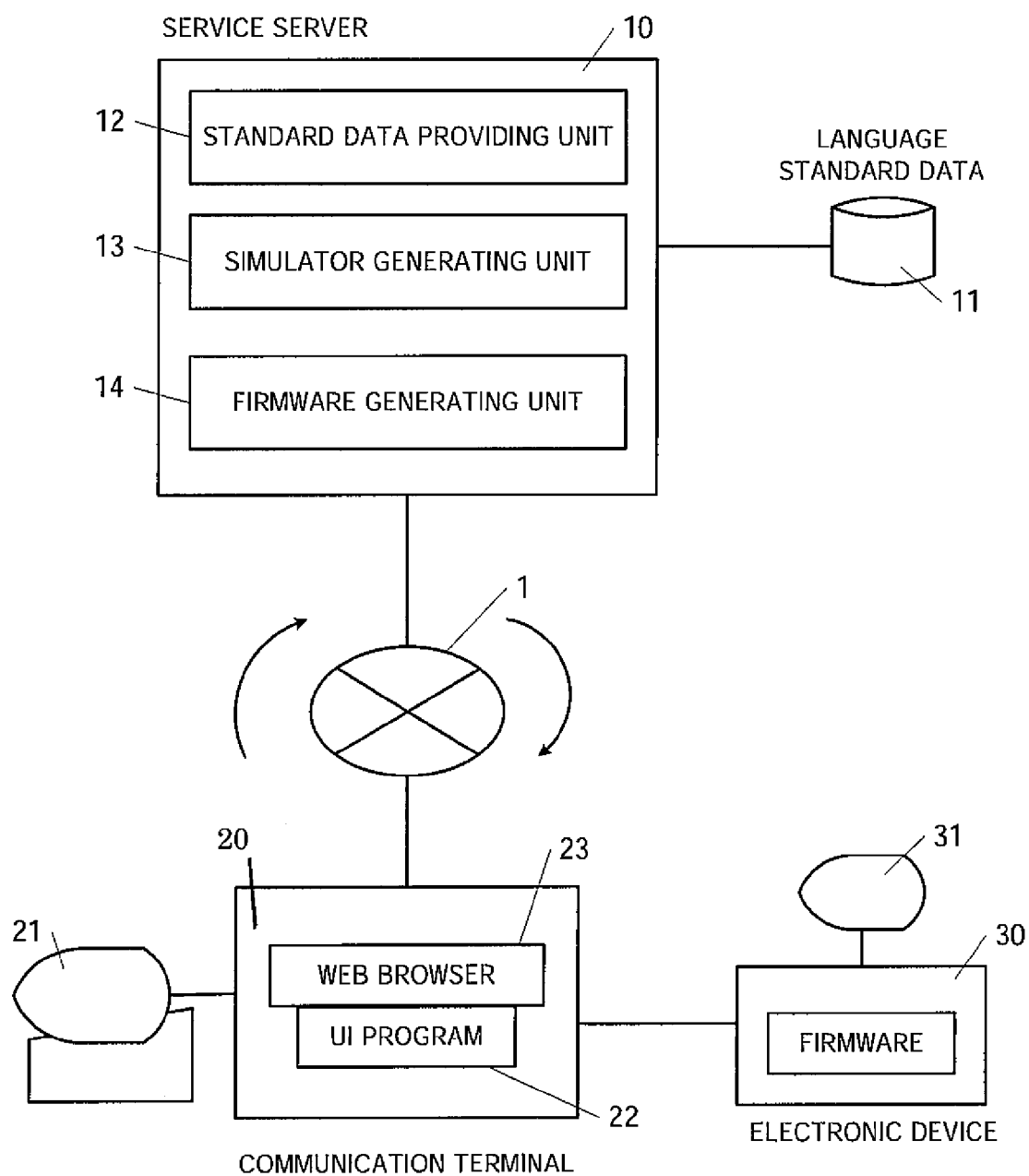
FIG. 1 illustrates a configuration of a system according to an embodiment of the present invention.

FIG. 1 illustrates a system configuration of a firmware providing system according to an embodiment of the present invention.

In the firmware providing system, a communication terminal 20 can download firmware of an electronic device 30, such as a facsimile machine, for example, from a service server 10 through a communication network 1 such as the Internet. The firmware is a display program that is provided for a display 31 of the electronic device 30 and that includes display information, such as various pieces of literal information of guidance and messages to be displayed. In addition to the literal information, the display information may include signs, symbols, and images, for example.

In the present embodiment, the electronic device 30 is connected with the communication terminal 20 that accesses the service server 10. Alternatively, a first communication terminal that is not connected with an electronic device may download a firmware of the electronic device that is connected with a second communication terminal. Further alternatively, a communication terminal 20 that requests the firmware may be different from a communication terminal 20 that downloads the firmware. In other words, an administrative communication terminal 20 may specify a communication terminal 20 connected with the electronic device 30 as a transmission destination terminal of the firmware with respect to a service server, and may then request the service server to download the firmware.

In the present system, firmware that has already been installed on the electronic device 30 may be changed to a desired content through an operation of the communication terminal 20. Accordingly, the service server 10 and the communication terminal 20 include the following configuration.

The service server 10 includes a language standard data file 11, a standard data providing unit 12, and a firmware generating unit 14. Display information compatible with a model of the electronic device 30 is stored in the language standard data file 11 in such a manner that the display information responds to a plurality of languages. The standard data providing unit 12 provides language standard data in a language that is specified from among the language standard data file 11 by the communication terminal 20. The firmware generating unit 14 generates firmware. In each of the language standard data included in the language standard data file 11, display information, such as operation guides and messages, for example, is collected as sequence data. The service server 10 further includes a simulator generating unit 13 arranged to generate a simulator based on a request made by the communication terminal 20.

The communication terminal 20 includes an operation displaying unit 21 that enables various operations, such as transmission to and reception from the service server 10 and an operation of editing the language standard data, for example, related to changes in the display information incorporated in the firmware. The communication terminal 20 further includes a user interface (UI) program 22 that is used to generate the firmware and to enable such operations of the operation displaying unit 21.

A standard data requesting operation for requesting specific language standard data and a literal data editing operation for generating new display information by rewriting/editing the returned language standard data can be performed through use of the UI program 22. Further, a request for generating a simulator based on the edited and generated display information and a request for generating firmware based on the edited display information can be made with respect to the service server 10 through the UI program 22.

Moreover, through the UI program 22, an operation of executing the simulator received from the service server 10 can be performed, and the UI program 22 further includes an installation tool for installing the firmware received from the service server 10 on the electronic device 30.

In order to simplify the configuration, the UI program 22 is preferably operated through a universal web browser 23 that enables browse and transmission of various pieces of information by being connected with the server etc. via the Internet 1.

Figure 2:
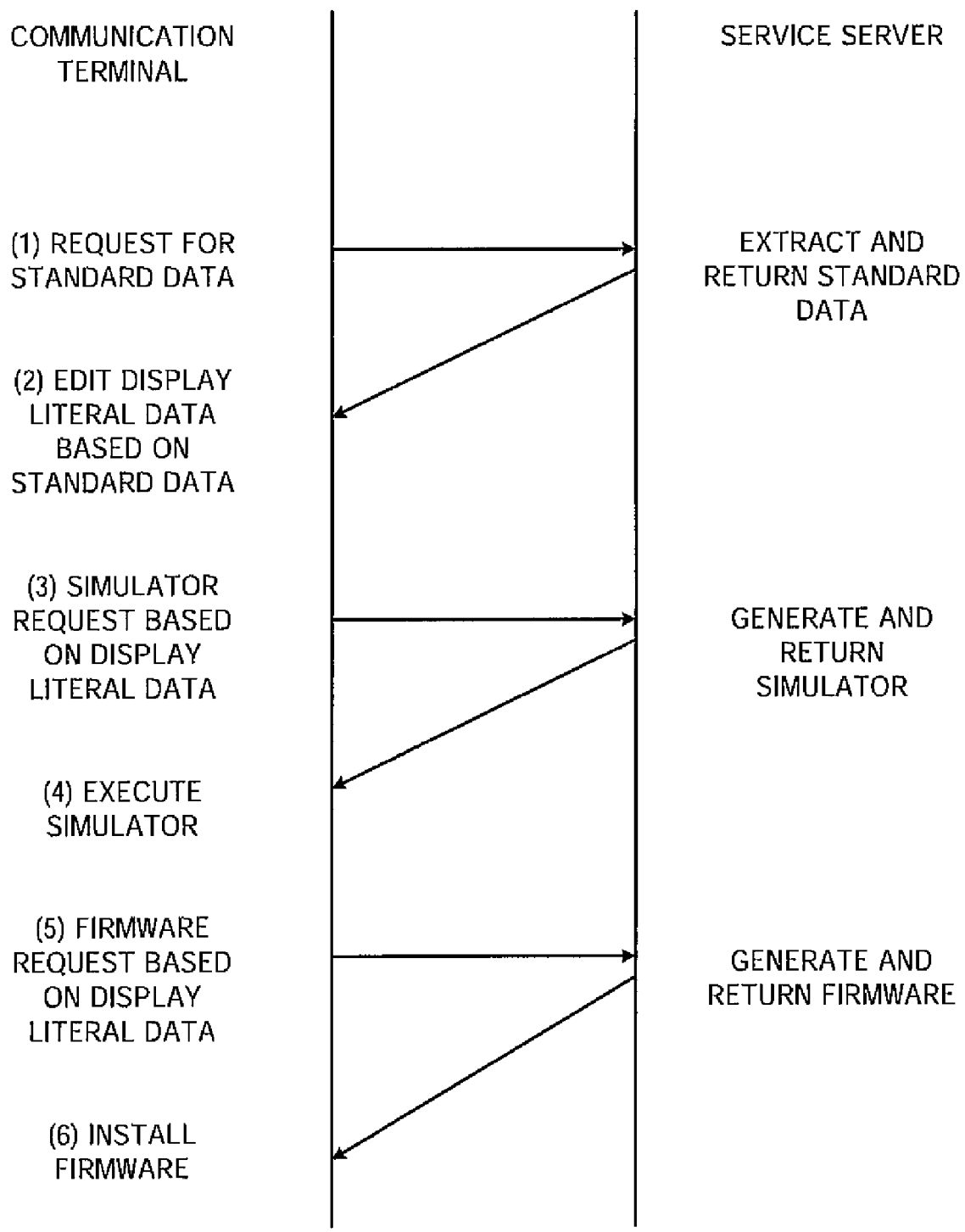
FIG. 2 illustrates a flow of the system according to an embodiment of the present invention.

FIG. 2 illustrates a flow of basic operations executed by the communication terminal 20 and the service server 10 to change and/or generate the firmware including the display information. FIGS. 3-6 illustrate a flow of screen displaying functions of the UI program 22 responding to the basic operations. In the following drawings and description, the display information is limited to literal display information. Accordingly, such display information is referred to as "literal information", and display information that has been edited based on the literal information is referred to as "display literal data".

The example of FIG. 2 illustrates a six-stage function of changing, generating, and installing the firmware. In the illustrated example, the following functions can be executed:
(1) a function of requesting and extracting the standard data;
(2) a function of editing the literal information based on the standard data;
(3) a function of requesting and generating the simulator;
(4) a function of confirmation through the execution of the simulator;
(5) a function of requesting and generating the firmware; and
(6) a function of installing the firmware.
The above numerals correspond to the reference numerals of FIG. 2.

Figure 3:
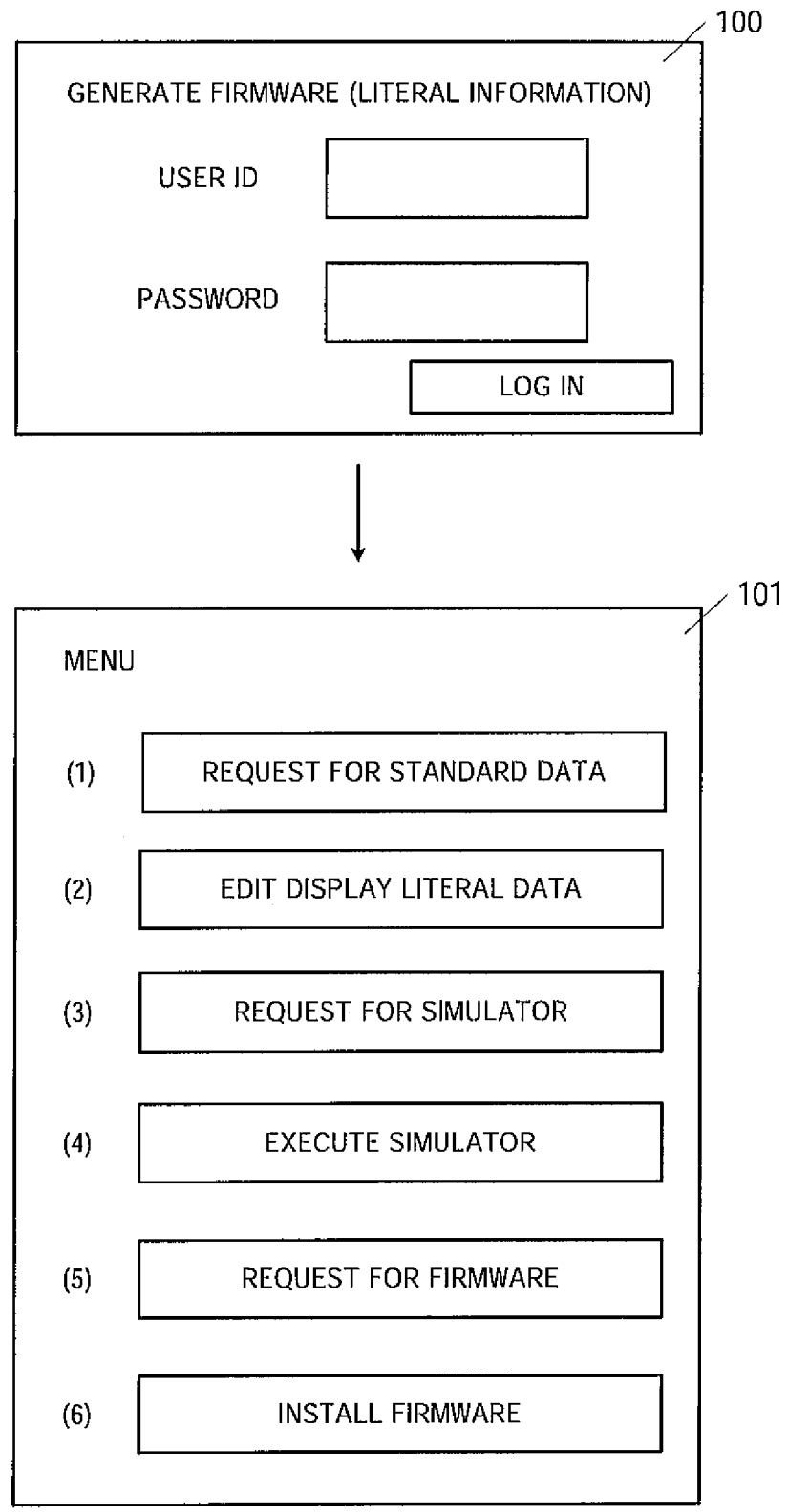
FIG. 3 illustrates a log-in screen and a menu screen of a User Interface (UI) program of a communication terminal according to an embodiment of the present invention.

As illustrated in FIG. 3, in order to enable a user to execute a series of the above functions, when the UI program 22 is launched, the communication terminal 20 displays a log-in screen 100, and when a log-in operation is performed on the screen 100, the communication terminal 20 displays a menu screen 101. The menu screen 101 has six selection items and thus enables the user to select one of the above functions (1)-(6).

In the present example, the selection menu screen 101 is provided to enable execution of each of the functions at random, but as described later, the screen 101 is configured in such a manner that each time a procedure ends, the process can proceed to a next procedure so as to execute the above functions sequentially. Each function is now described. The UI program 22 can be executed through a web browser. Accordingly, in addition to various pieces of transmission data and received data, which are described later, the communication terminal 20 also receives screen information data defining a web screen from the service server 10. The description and illustration of such data are omitted.

Figure 4:
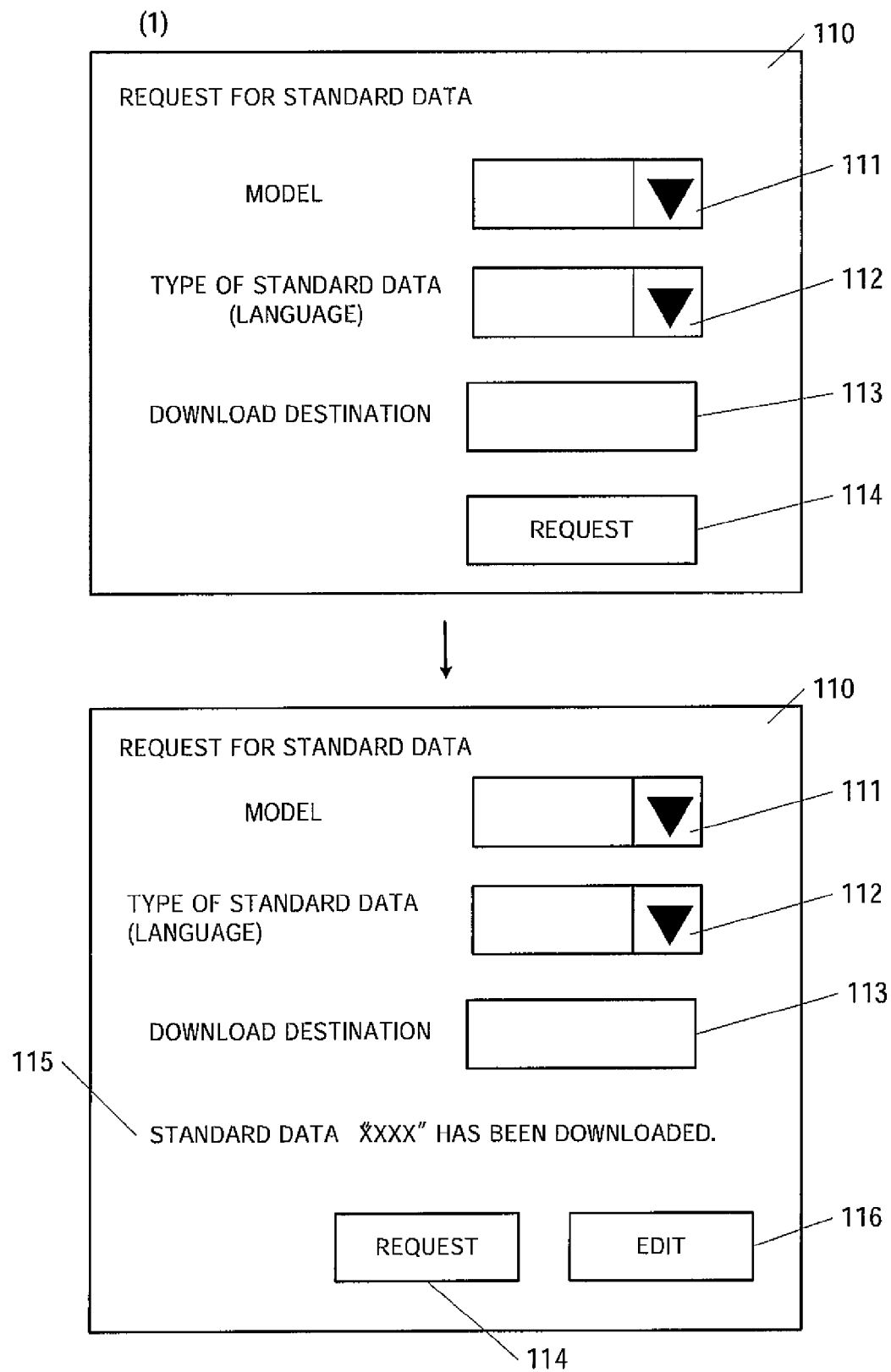
FIG. 4 illustrates a language-standard-data request screen of the UI program according to an embodiment of the present invention.

(1) Request and Extraction of Standard Data (FIGS. 2-4)

When a request for language standard data is selected on the selection menu screen 101, the communication terminal 20 displays a screen that corresponds to the requesting function. When a model 111 of the electronic device 30 on which the firmware is installed, a type (language type) 112 of the language standard data, and a download destination 113 are input, and a request button 114 is operated on the standard data request screen 110, the communication terminal 20 transmits a request for the specified language standard data to the service server 10. The download destination 113 is used to specify a path and a file name, and in the download destination 113, a communication terminal that is different from the requesting communication terminal 20 may be specified as a return target terminal.

When the request is received, the service server 10 extracts the specified standard data from the language standard data file 11 and returns the extracted data to the communication terminal 20.

When the specified language standard data is received from the service server 10, the communication terminal 20 additionally displays a message indicating the data reception and an edit button 116 used to proceed to editing that is based on the language standard data. When the edit button 116 is operated, the process proceeds to the next editing function.

(2) Editing of Display Literal Data Based on Standard Data (FIGS. 2, 3, and 5)

The communication terminal 20 displays a tabular-form edit screen 120 illustrated in FIG. 5 to enable the editing of the language standard data received in function (1), by rewriting the literal information of the received data with respect to each of a plurality of messages included in the literal information.

An operation guide, a type of the selection menu etc., and the literal information corresponding to the type are displayed in a literal information list 121 of the edit screen 120. The user can change the literal information to a desired content. For example, in the case of standard data written in English, a message "Copying is ready" can be changed to a message (expression) including a simple German phrase, such as "Copying ist bereit". The user can also change the message "Copying is ready" to a more polite phrasing, such as "Please read document through ADF or place document on document table". Further, the literal information can also be changed to another dialect, phrasing, or expression using symbols and pictographic characters.

When the user specifies a name 122 and operates an output button 123 after performing the desired rewriting/editing operation, the communication terminal 20 outputs and stores the display literal data having the specified name. The communication terminal 20 further adds and displays a message 124 indicating the completion of the output, a request button 125 used to request a generation of a simulator, and a request button 126 used to request a generation of a firmware.

A Comma Separated Value (CSV) format in which data is separated by commas can be used as the format of the display literal data. Since the CSV format has broad utility and can be used in various types of application software, reading and writing operations can be easily performed by the service server through universal software.

When the request button for simulator generation is operated, the process proceeds to the function of generating the simulator. When the request button for generating the firmware is operated, the process proceeds to the firmware generating function (5).

Figure 6:
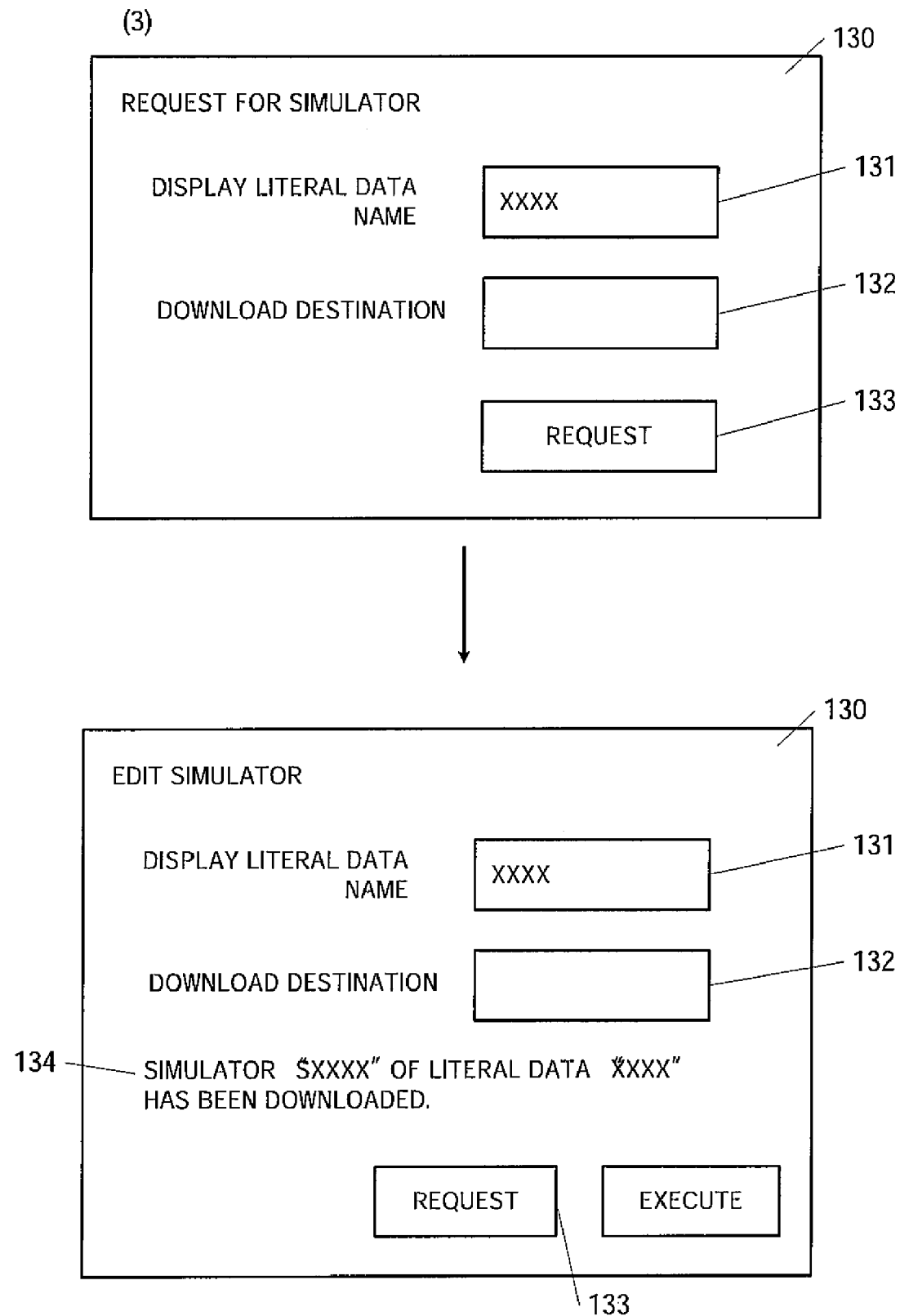
FIG. 6 illustrates a simulator request screen of the UI program according to an embodiment of the present invention.

(3) Request and Generation of Simulator (FIGS. 2, 3, and 6)

When the operation of proceeding to the simulator is performed in process (2), the communication terminal 20 displays a request screen 130 used to generate the simulator. Since the process follows the editing operation of process (2), a data name output in the editing operation is displayed in a display literal data name section 131. When the user specifies a path and a file name in a download destination 132 and operates a request button 133, the communication terminal 20 transmits the request along with the display literal data to the service server 10. In the download destination 132, a communication terminal that is different from the requesting communication terminal 20 may be specified as a return target terminal.

Upon receiving the request, the service server 10 generates the simulator based on the received display literal data and returns the simulator to the communication terminal 20. When the display literal data is in the CSV format, a simulator generation program is incorporated in a macro of spreadsheet software to generate the simulator in conjunction with an operation of reading out the display literal data.

Upon receiving the generated simulator, the communication terminal 20 adds and displays a message 134 indicating the reception of the simulator and an execution button 135 used to execute the simulator. When the user operates the execution button 135, the process proceeds to the function of executing the simulator.

Figure 7:
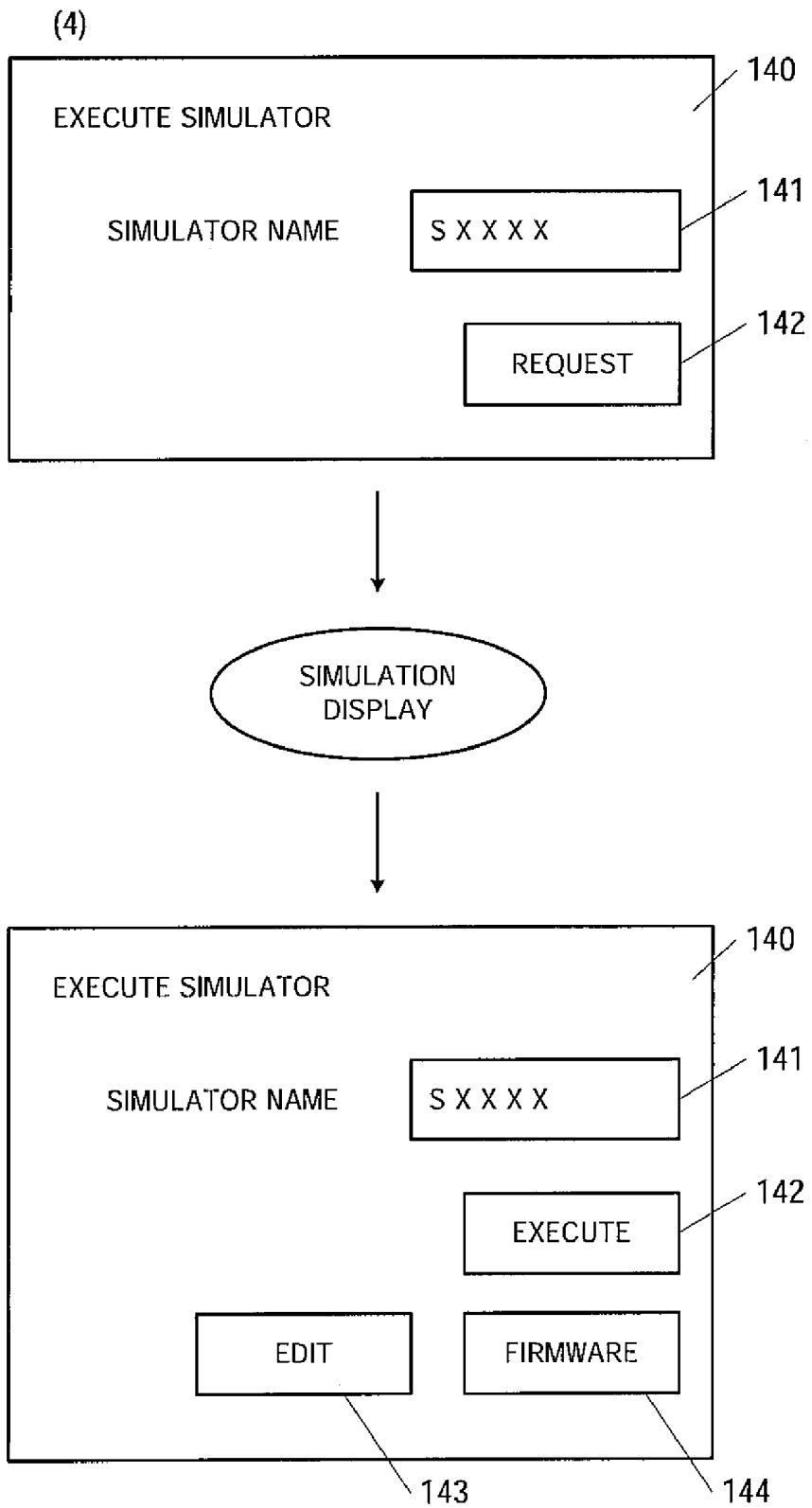
FIG. 7 illustrates a simulator execution screen of the UI program according to an embodiment of the present invention.

(4) Execution of Simulator (FIGS. 2, 3, and 7)

When the simulator execution button 135 is operated in the process (3), the communication terminal 20 displays a simulator execution screen 140. The simulator execution screen 140 displays an input section 141 for a simulator name and an execution button 142. Since the process follows the simulator requesting operation (3), a name of the simulator generated in response to the request is displayed in the input section 141 of the simulator name. When the user operates the execution button 142, the communication terminal 20 launches the received simulator.

Although a display example of a screen corresponding to the simulator execution is not illustrated, a display screen of the electronic device 30 appears in the simulation display schematically, and in the schematic screen, various screens (for example, an initial screen and a selection menu) are displayed in turn every few seconds. While viewing such a transiting screen, the user can confirm the example of the actual display of the display literal data generated in the process (2).

When the simulation display is ended, the communication terminal 20 displays on the screen an execution button 142 used to re-execute the simulator, an edit button 143, and a request button 144 used to request the generation of the firmware.

After confirming the simulator execution, if the user needs to correct the display literal data, the user can proceed to the editing function by operating the edit button, and if there is no correction to be made in the display literal data, the user can proceed to the function of generating the firmware by operating the firmware generation request button.

(5) Request and Generation of Firmware (FIGS. 2, 3, 8)

When the firmware request button is operated in the process (4), the communication terminal 20 displays a request screen 150 used to generate the firmware. Since the process follows the editing operation of the process (2), a name of the data that is output in response to the editing operation is displayed in a display literal data name section 151. When the user specifies a path and a file name in a download destination 152 and operates a request button 153, the communication terminal 20 transmits such a request along with the display literal data to the service server 10. In the download destination 152, a communication terminal that is different from the requesting communication terminal 20 may be specified as a return target terminal.

Upon receiving the firmware generation request, the service server 10 generates the firmware based on the received display literal data, and returns the generated firmware to the communication terminal 20. For example, the communication server 10 incorporates the received display literal data in a prescribed display program that responds to a specified model, compiles and links the program, and thus generates an executable binary module. When the display literal data is in the CSV format, a compiler and a linker are incorporated in the macro of spreadsheet software, and then the firmware may be generated in connection with the operation of reading out the display literal data by using the compiler-and-Linker incorporated macro. When an address can be set at the time of installation, address information may not be added to the executable module.

A format of the executable module may be a format of data that is composed of only literal information and that does not include a logical portion.

Upon receiving the generated firmware, the communication terminal 20 adds and displays a message 154 indicating such a reception and an execution button 155 used to install the firmware. When the user operates the installation execution button 155, the process proceeds to the function of installing the firmware.

(6) Installation of Firmware (FIGS. 2 and 3)

When the execution of firmware installation is requested in the process (5), the communication terminal 20 displays an installation screen for the firmware. The screen is a user interface screen used to execute the installation tool prepared by the communication terminal 20 and is used to install the firmware via a Universal Serial Bus (USB) on the electronic device 30 connected with the communication terminal 20. For example, various settings can be performed in the form of a dialogue, and a firmware type, an address of a flash memory to be loaded, for example, may be set as setting items.

Thus, the user can generate and change the firmware including the literal information to be installed on the electronic device 30, in the form of a dialogue with the operation displaying unit 21 of the communication terminal 20 by using the UI program 22. Accordingly, the user can change the literal information such as guidance messages to a desired content. Moreover, as described in the above embodiment, since the user can operate the communication terminal 20 through the UI program 22, the user does not need to ask for maintenance personnel, and can change the literal information displayed on the display of the electronic device 30 at a desired timing.

Further, since the service server 10 includes the language standard data that responds to the plurality of languages in accordance with the model of the electronic device 30, the standard data that is desired by the user can be downloaded in response to the request made the communication terminal 20. Since the user can download the desired language standard data, the user can change a currently used language of all the messages into another language. Furthermore, since the language standard data can be displayed and edited through the UI program 22, the user can select a specific message from the standard data and change the selected message.

Through the use of the UI program 22, the series of the firmware generating function and the firmware installing function of processes (1)-(6) can be sequentially performed while the screen of each function is transiting as described above, or the process can be resumed from a halfway function. When resuming from the halfway function, the user can select a desired function on the selection menu screen 101 illustrated in FIG. 3.

For example, as a result of the simulator execution, if editing is necessary, the process can return to the editing function of the process (2), and re-correction can be performed.

Further, as described in the above embodiments, the language standard data and the download destination of the simulator and of the firmware can be specified in the present system. That is, the communication terminal 20 through which the UI program 22 is executed can return data etc. that is extracted and generated through the service server 10 to another communication terminal. Therefore, the request for returning a plurality of language standard data and the request for generating the simulator and the firmware can be simultaneously made by an administrative personal computer used for the electronic device in an office, or the like, and such data, simulator, and the firmware can be returned to another personal computer connected with each of the electronic devices.

In the above embodiment, when the request from the communication terminal 20 is received, the service server 10 automatically performs the generation and return of the simulator and the generation and return of the firmware through each of the units 12, 13, 14, however, such generation may be performed through an operation by an operator.

When the operator operates the service server 10, the communication terminal can be notified of a generation completion via an e-mail having main text information that enables the execution of the UI program by a link operation. When the user opens the e-mail at the communication terminal and performs the link operation on the UI program of the main text, the process proceeds to the next function.

While the present invention has been described with respect to embodiments thereof, it will be apparent to those skilled in the art that the disclosed invention may be modified in numerous ways and may assume many embodiments other than those specifically set out and described above, Accordingly, the appended claims cover all modifications that fall within the true spirit and scope of the present invention.

What is claimed is:

1. A firmware providing method in which firmware for an electronic device is downloaded from a service server provided on a communication network to a communication terminal, wherein:
    display information to be displayed on a display of the electronic device is stored in the service server as language standard data that responds to a plurality of languages in accordance with a model of the electronic device;
    the communication terminal includes a user interface program including a web browser connected to the service server via the Internet that downloads, from among the language standard data, data in which a model of the electronic device and a language are specified;
    the communication terminal then edits by rewriting at least a portion of the language standard data itself;
    the communication terminal then transmits the edited display information to the service server; and
    in response thereto, the service server generates firmware for the electronic device of the same model based on the edited display information, and then returns the firmware to a return target terminal, wherein based on the display information returned from the communication terminal, the service server generates a simulator by which a simulation display of the display information is executed; and
    the simulator is downloaded to the return target terminal.

2. A communication terminal that downloads firmware for an electronic device from a service server provided on a communication network,
    the communication terminal comprising a user interface program including a web browser connected to the service server via the Internet that is embodied in a non-transitory computer readable medium, wherein:
    the user interface program downloads, from among language standard data stored in the service server that responds to a plurality of languages in accordance with a model of the electronic device, data in which a model of the electronic device and a language are specified;
    the user interface program then edits by rewriting at least a portion of the language standard data itself; and
    the user interface program then transmits the edited display information to the service server for use in generating firmware for the electronic device of the same model based on the edited display information, wherein based on the display information returned from the communication terminal, the service server generates a simulator by which a simulation display of the display information is executed; and the simulator is downloaded to the return target terminal.

3. A service server that transmits firmware for an electronic device to a communication terminal via a communication network, the service server comprising:
    language standard data embodied in a non-transitory computer readable medium in which display information to be displayed on a display of the electronic device is stored in such a manner that the display information responds to a plurality of languages in accordance with a model of the electronic device;
    a standard data providing unit embodied in a non-transitory computer readable medium that transmits specified data from among the language standard data to a user interface program of the communication terminal including a web browser connected to the service server via the Internet when a return request for the language standard data in which a model of the electronic device and a language are specified is received from the communication terminal; and
    a firmware generating unit embodied in a non-transitory computer readable medium that generates the firmware for the electronic device of the same model based on the display information when the display information in which at least a portion of the language standard data itself has been edited by rewriting is received from the communication terminal, wherein based on the display information returned from the communication terminal, the service server generates a simulator by which a simulation display of the display information is executed; and the simulator is downloaded to the return target terminal.

* * * * *